United States Patent
Asano et al.

(10) Patent No.: US 7,301,963 B2
(45) Date of Patent: Nov. 27, 2007

(54) METHOD AND DEVICE FOR DATA RELAYING

(75) Inventors: Yutaro Asano, Kanagawa (JP); Koji Tanaka, Kanagawa (JP); Haruo Shibata, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 1083 days.

(21) Appl. No.: 10/327,572

(22) Filed: Dec. 20, 2002

(65) Prior Publication Data

US 2003/0117988 A1 Jun. 26, 2003

(30) Foreign Application Priority Data

Dec. 21, 2001 (JP) ............................. 2001-390465

(51) Int. Cl.
*H04J 3/16* (2006.01)
(52) U.S. Cl. .................................... 370/466; 455/432.1
(58) Field of Classification Search ................ 370/338, 370/342–349, 465–466, 392–393
See application file for complete search history.

(56) References Cited

U.S. PATENT DOCUMENTS

| | | | |
|---|---|---|---|
| 6,842,456 B1* | 1/2005 | Chen et al. | 370/401 |
| 2002/0057657 A1* | 5/2002 | La Porta et al. | 370/331 |
| 2002/0147820 A1* | 10/2002 | Yokote | 709/229 |
| 2004/0071120 A1* | 4/2004 | Grech | 370/338 |
| 2004/0137888 A1* | 7/2004 | Ohki | 455/417 |
| 2006/0062214 A1* | 3/2006 | Ng et al. | 370/389 |

FOREIGN PATENT DOCUMENTS

| | | |
|---|---|---|
| JP | 11-032087 A | 2/1999 |
| JP | 2000-224233 A | 8/2000 |
| JP | 2001-144811 A | 5/2001 |
| JP | 2001-168906 A | 6/2001 |
| JP | 2001-224070 A | 8/2001 |
| JP | 2001-268129 | 9/2001 |
| JP | 2001-274834 A | 10/2001 |

* cited by examiner

*Primary Examiner*—Chi Pham
*Assistant Examiner*—Thai Hoang
(74) *Attorney, Agent, or Firm*—Townsend and Townsend and Crew LLP (57) ABSTRACT

A method of relaying data between a first terminal device connected to a first network and a second terminal device connected to a second network comprises: searching in a storing device based on location information accompanying data received from the first terminal device or the second terminal device, the storing device storing location information indicative of a location of at least the first terminal device; as a result of the searching, if the location information exists in the storing device, converting the location information accompanying the data so that the location information stored in the storing device becomes a new location information of the data; and sending the data accompanied with the location information having been converted to the second terminal device or the first terminal device.

16 Claims, 8 Drawing Sheets

| HOME ADDRESS | CARE-OF ADDRESS |
|---|---|
| 2000::1 | 2001::1 |
| 2000::10 | 2003::6 |
| ⋮ | ⋮ |

METHOD AND DEVICE FOR DATA RELAYING

CROSS-REFERENCE TO RELATED APPLICATIONS

The present application claims priority upon Japanese Patent Application No. 2001-390465 filed on Dec. 21, 2001, which is herein incorporated by reference.

BACKGROUND OF THE INVENTION

1. Field of the Invention

The present invention relates to a data-relaying method and a data-relaying device.

2. Description of the Related Art

Recently, mobile personal computers equipped with communication functions have become capable of connecting to and enjoying service from a visited or foreign network in a so-called mobile-computing environment. Currently, based on the IPv6 (Internet Protocol version 6) standard, protocols such as Mobile IPv6 are being proposed as communication methods for terminal devices (such as personal computers and/or PDAS) serving as nodes.

In Mobile IPv6, the terminal device (hereinafter referred to as "terminal") has two IP addresses: a home address and a care-of address. The care-of address changes according to the sub-network to which the terminal is connecting, according to movement of the terminal. The home address is fixed and does not change, even if the terminal moves. Japanese Patent Application Laid-open Publication No. 2001-268129 discloses a technique relating to communication between terminals complying with the above-mentioned Mobile IPv6 (such terminals are hereinafter referred to as "Mobile-IPv6-compliant terminals").

Figure 1:
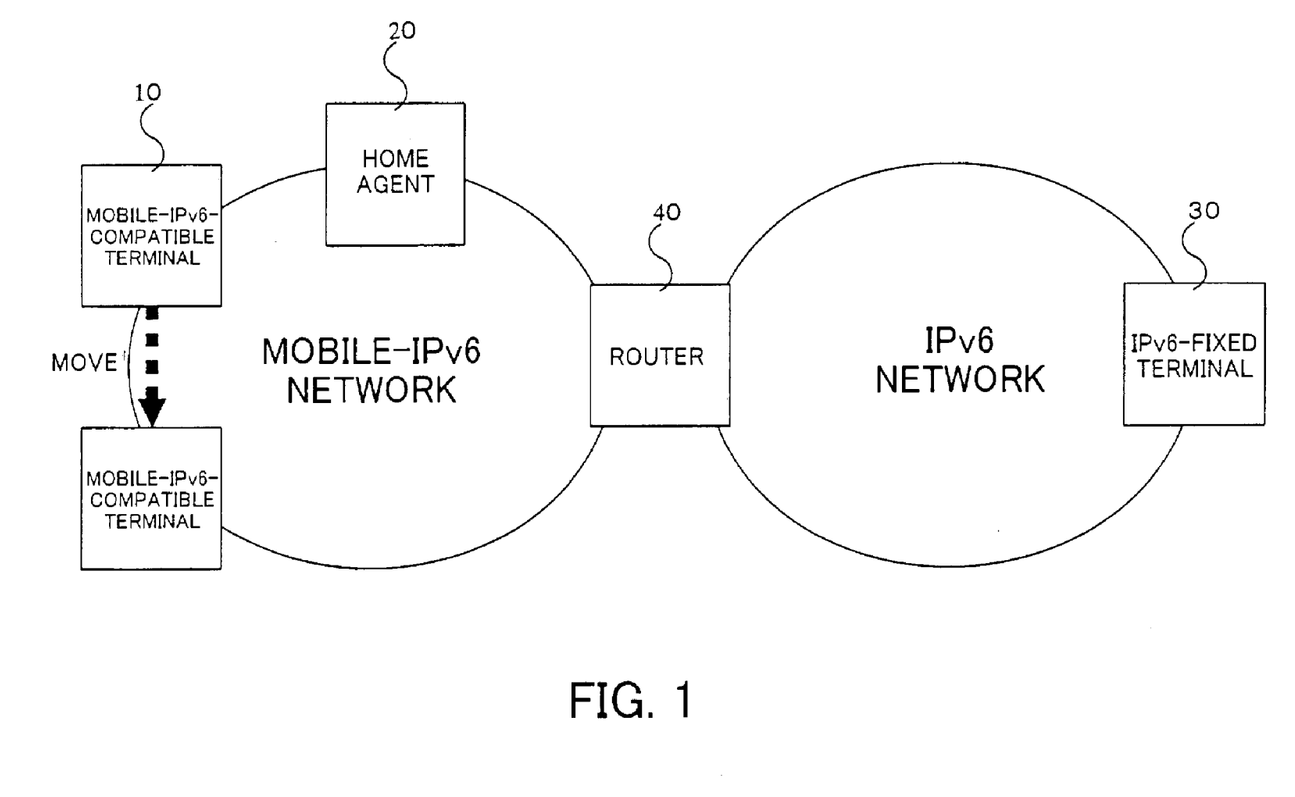
FIG. 1 is a diagram showing a configuration of a network comprising a data-relaying device according to one embodiment of the present invention.

Now, consider a situation of carrying out packet communication between the Mobile-IPv6-compliant terminal and a terminal complying with IPv6 but not with Mobile IPv6 (these terminals are hereinafter referred to as "IPv6-fixed terminals"). As shown in the block diagram of FIG. 1, a movable Mobile-IPv6-compliant terminal 10 and a home agent 20 are connected to a Mobile-IPv6-compliant network (or first network). On the other hand, an IPv6-fixed terminal 30 is connected to a network complying with IPv6 but not complying with Mobile IPv6 (or second network; hereinafter referred to as "IPv6 network"). The Mobile-IPv6-compliant network and the IPv6 network are connected via a router 40. The home agent 20 stores an address-management table in an accompanying storing section. The table establishes relation between the home address and the care-of address. The home agent 20 receives a packet having a new care-of address from the Mobile-IPv6-compliant terminal 10 that has moved, and updates the address-management table.

Figure 2:
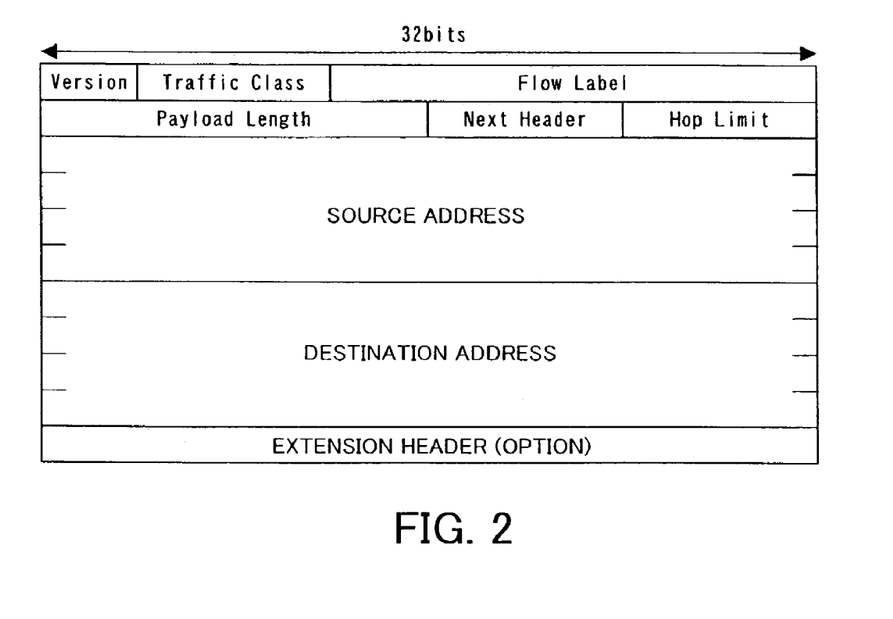
FIG. 2 is a diagram showing a structure of a format of a message header of an IPv6 packet according to one embodiment of the present invention.
Figure 3:
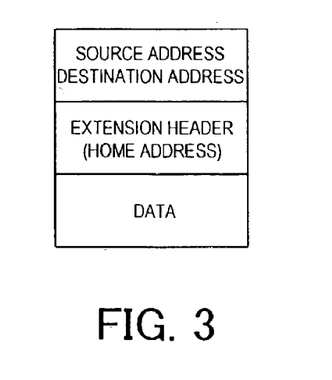
FIG. 3 is a diagram showing a data structure of a Mobile-IPv6 packet according to one embodiment of the present invention.

FIG. 2 shows a format of a message header attached to data in an IPv6 packet. The header shown in FIG. 2 includes, for example: protocol version; traffic class for identifying and distinguishing priority; and flow label for identifying packets which require special operations at the router 40. Further, the header includes: source address which is the address of the terminal sending the packet; destination address which is the address of the terminal receiving the packet; and extension header as an option. Further, as shown in FIG. 3, although the header of a Mobile IPv6 packet has the same format as the message header of an IPv6 packet shown in FIG. 2, the home address is also included in the extension header.

Figure 4:
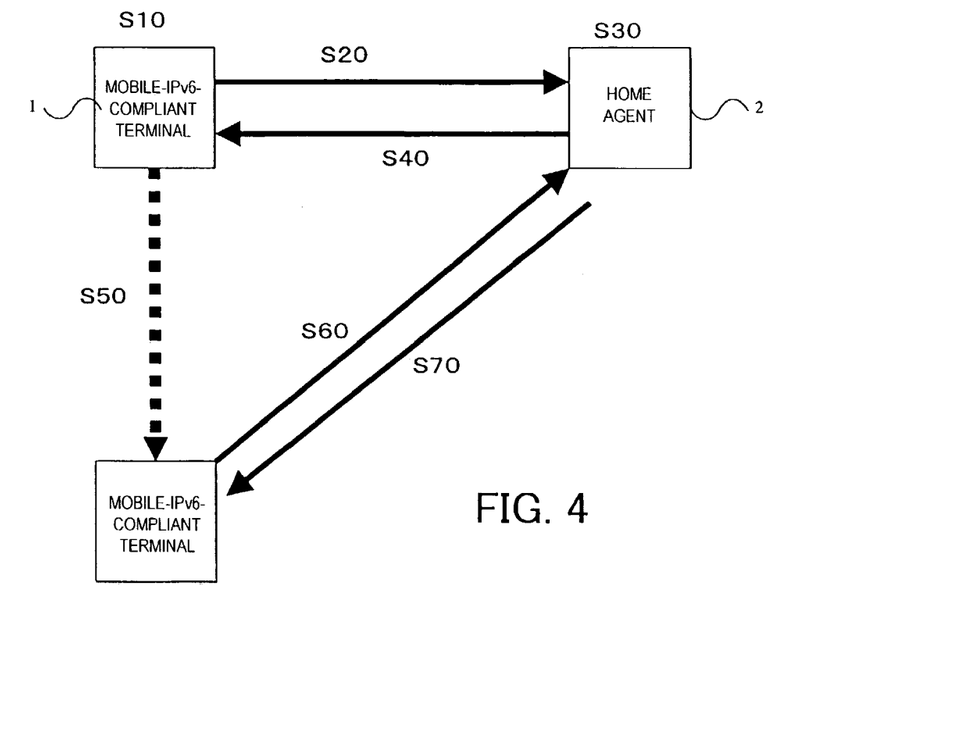
FIG. 4 is a conceptual diagram showing how the Mobile-IPv6-compliant terminal informs the home agent according to one embodiment of the present invention.
Figure 5:
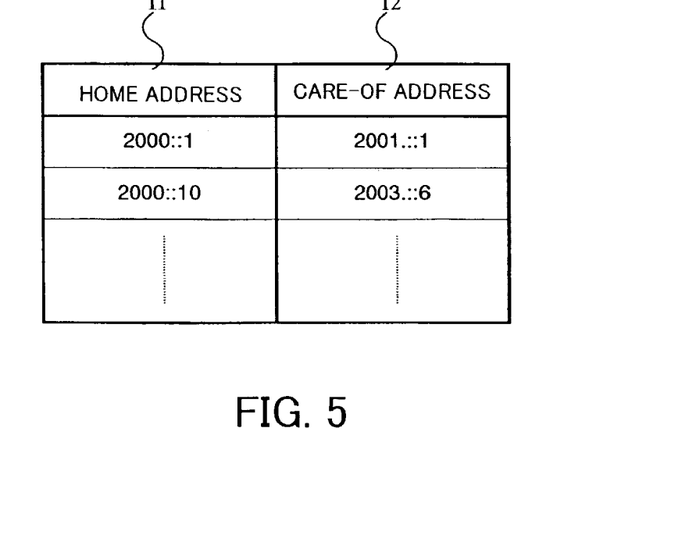
FIG. 5 is a diagram showing a structure of an address-management table according to one embodiment of the present invention.

Explanation will be made of a case where the Mobile-IPv6-compliant terminal 10 is turned on and has moved. As shown in the block diagram of FIG. 4, the Mobile-IPv6-compliant terminal 10 having been turned on informs its home address and care-of address to the home agent 20 (S10→S20 in FIG. 4). As shown in FIG. 5, the home agent 20 registers the informed home address 11 and the care-of address 12 with the address-management table (S30). Further, the home agent 20 responds an acknowledge packet to the Mobile-IPv6-compliant terminal 10 (S40). Then, when the Mobile-IPv6-compliant terminal 10 moves (S50), the terminal 10 informs to the home agent 10 the unchanged home address 11 and the new care-of address 12 that has changed after movement (S60). As shown in FIG. 5, the home agent 20 registers the informed home address 11 and the care-of address 12 with the address-management table, and responds an acknowledge packet to the Mobile-IPv6-compliant terminal 10 (S70).

Figure 6:
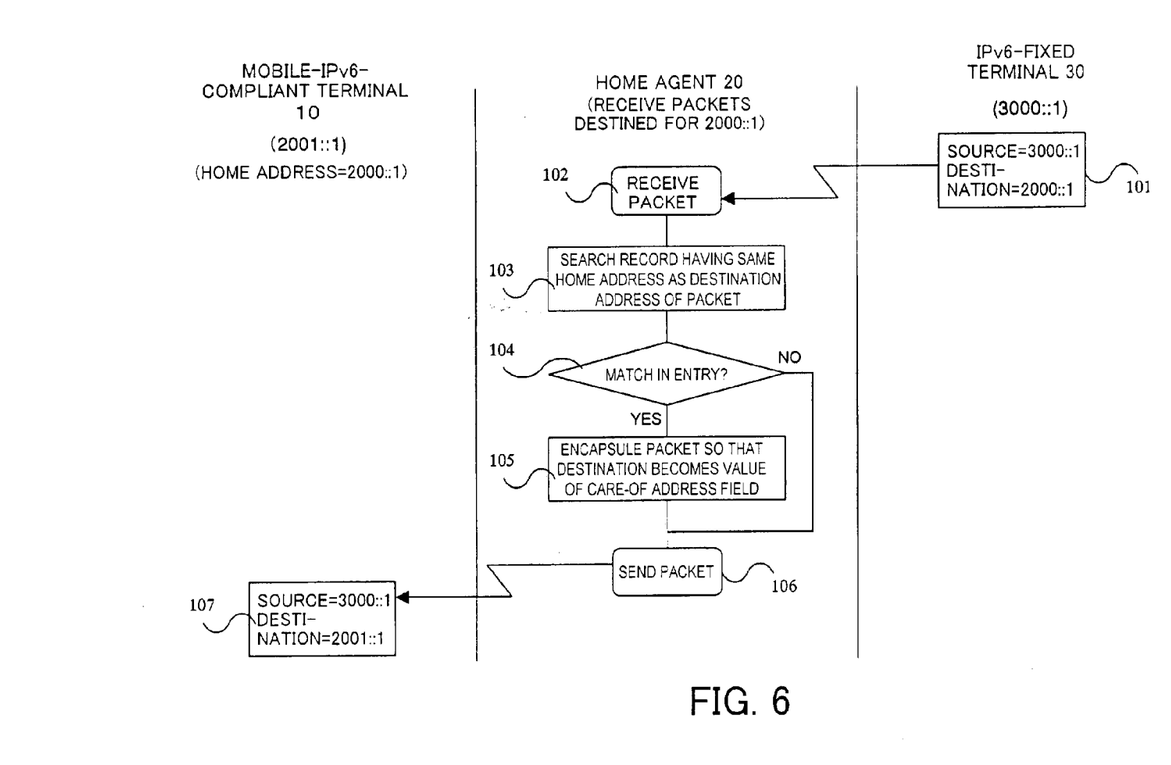
FIG. 6 is a flowchart showing conventional procedures of sending a packet from an IPv6-fixed terminal to a Mobile-IPv6-compliant terminal.

Specific explanation will be made of packet-communication processing between the Mobile-IPv6-compliant terminal 10, which informs the home address 11 and the care-of address 12 to the home agent 20, and the IPv6-fixed terminal 30 via the home agent 20. Firstly, with reference to the flowchart shown in FIG. 6, explanation will be made of sending a packet from the IPv6-fixed terminal 30 to the Mobile-IPv6-compliant terminal 10. As shown in FIG. 6, the Mobile-IPv6-compliant terminal 10 has a value 2001::1 as the care-of address, and a value 2000::1 as the home address.

The IPv6-fixed terminal 30 has a value 3000::1 as its address. Upon sending a packet, the IPv6-fixed terminal 30 sets the source address to be its own address (i.e., 3000::1) and the destination address to be the home address of the Mobile-IPv6-compliant terminal 10 to which the packet is to be sent (i.e., 2000::1) (see 101 in FIG. 6). The home agent 20 receives the packet (102), and searches in the address-management table of FIG. 5 for a record having the same home address as the destination address of the packet (103). If there is a matching record as a result of the search (104, "match in entry" in FIG. 6), the home agent 20 generates (or encapsules) the packet so that the designation has the value indicated in the care-of field, and then sends the packet (105→106). That is, the Mobile-IPv6-compliant terminal 10 receives a packet having a destination with the value in the care-of field (2001::1). Here, the source address of the packet to be sent is kept the same, while the destination address is the care-of address. Thus, even when the Mobile-IPv6-compliant terminal 10 moves, it is possible to update its care-of address in the address-management table of the home agent 20, as explained above.

However, regardless of whether the Mobile-IPv6-compliant terminal 10 has moved or not, if the IPv6-fixed terminal 30 starts communication with the Mobile-IPv6-compliant terminal 10, the IPv6-fixed terminal 30 will send a packet designating the destination to be the home address of the Mobile-IPv6-compliant terminal. Then, communication cannot be established because in a response from the Mobile-IPv6-compliant terminal 10, its care-of address will be the source address.

Figure 7:
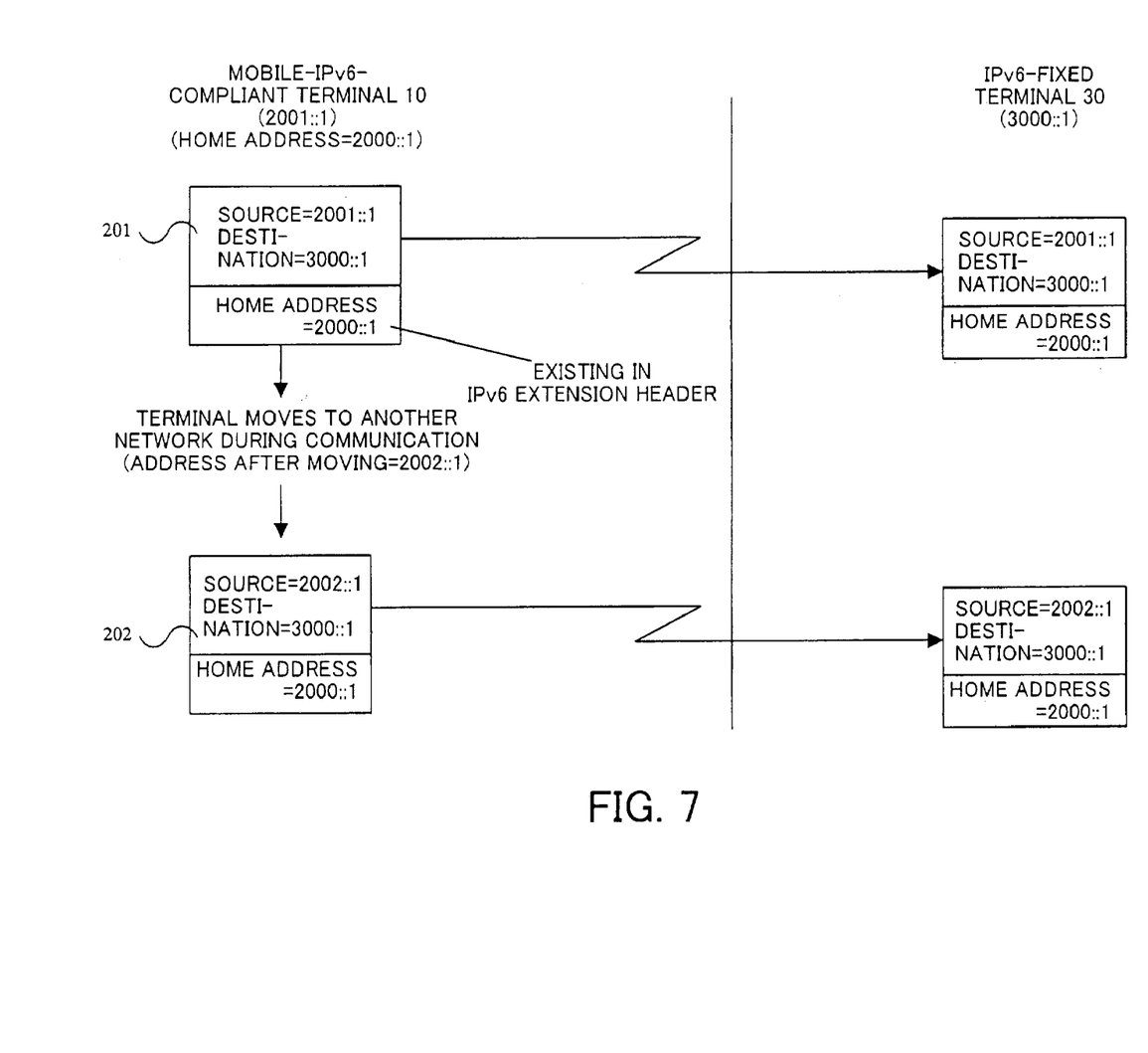
FIG. 7 is a flowchart of a conventional embodiment for sending a packet from a Mobile-IPv6-compliant terminal to an IPv6-fixed terminal.

On the other hand, with reference to FIG. 7, explanation will be made on sending a packet from the Mobile-IPv6-compliant terminal 10 to the IPv6-fixed terminal 30. As shown in FIG. 7, the Mobile-IPv6-compliant terminal 10 has a value 2001::1 as the care-of address, and has a value 2000::1 as the home address. The IPv6-fixed terminal 30 has a value 3000::1 as its address.

Before moving, upon sending a packet, the Mobile-IPv6-compliant terminal 10 sets the source address to have a value having its own care-of address (i.e., 2001::1), and sets the destination address to have a value having the address of the IPv6-fixed terminal 30 to which the packet is sent (i.e., 3000::1) (201 in FIG. 7). Here, the IPv6-extension header of the packet includes a value of the home address of the Mobile-IPv6-compliant terminal 10 (i.e., 2000::1). The IPv6-fixed terminal 30 stores each of the addresses included in the header of the received packet in its storing section. That is, the value of the source address is kept to be 2001::1 in the IPv6-fixed terminal 30. Then, during packet communication, as the terminal moves to another network, the care-of address changes to a value 2002::1 after movement (202). Then, packets including a source address having the care-of address with the changed value will be sent to the IPv6-fixed terminal 30.

Therefore, since the source address differs before and after movement of the terminal 10, packet communication from the same source cannot be identified, and thus, continued packet communication cannot be maintained. That is, if the source Mobile-IPv6-compliant terminal 10 moves, the Mobile-IPv6-compliant terminal 10 will send a packet to the IPv6-fixed terminal 30 using the new care-of address after movement. Therefore, the IPv6-fixed terminal 30 will not be able to receive packets using the new care-of address after movement, which is different from that before movement. Therefore, packet loss will occur.

SUMMARY OF THE INVENTION

The present invention has been contrived to solve the above and other problems, and one technique of relaying data according to the present invention is a method of relaying data between a first terminal device connected to a first network and a second terminal device connected to a second network. The method comprises: searching in a storing device based on location information accompanying data received from the first terminal device or the second terminal device, the storing device storing location information indicative of a location of at least the first terminal device; as a result of the searching, if the location information exists in the storing device, converting the location information accompanying the data so that the location information stored in the storing device becomes a new location information of the data; and sending the data accompanied with the location information having been converted to the second terminal device or the first terminal device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Summary of the Disclosure

At least the following matters will be made clear by the explanation in the present specification and the description of the accompanying drawings.

One aspect of the present invention is a method of relaying data between a first terminal device connected to a first network and a second terminal device connected to a second network, the method comprising: searching in a storing device based on location information accompanying data received from the first terminal device, the storing device storing location information indicative of a location of at least the first terminal device; as a result of the searching, if the location information exists in the storing device, converting the location information accompanying the data so that the location information stored in the storing device becomes a new location information of the data; and sending the data accompanied with the location information having been converted to the second terminal device.

The storing device may store the location information that changes according to movement of the first terminal device.

The location information may include a home address and a care-of address, and when the care-of address of the first terminal device changes, the storing device may store the care-of address having changed in a manner the care-of address having changed corresponds to the home address.

Upon relaying the data from the first terminal device to the second terminal device, a source address of the data may be converted from the care-of address to the home address corresponding to the care-of address.

Upon relaying the data from the second terminal device to the first terminal device, a destination address of the data may be converted from the home address to the care-of address corresponding to the home address.

Another aspect of the present invention is a data-relaying device used for a method of relaying data between a first terminal device connected to a first network and a second terminal device connected to a second network, the data-relaying device comprising: means for receiving location information of at least either one of the first terminal device or the second terminal device; means for storing the location information; means for receiving data upon data communication between the first terminal device and the second terminal device; means for searching in the storing means based on location information accompanying the data received from the first terminal device; means for converting the location information accompanying the data if the location information exists in the storing means as a result of the searching, so that the location information stored in the storing means becomes a new location information of the data; and means for sending the data accompanied with the location information having been converted to the second terminal device.

A further aspect of the present invention is a method of relaying data between a first terminal device connected to a first network and a second terminal device connected to a second network, the method comprising: searching in a storing device based on location information accompanying data received from the first terminal device or the second terminal device, the storing device storing location information indicative of a location of at least the first terminal device; as a result of the searching, if the location information exists in the storing device, converting the location information accompanying the data so that the location information stored in the storing device becomes a new location information of the data; and sending the data accompanied with the location information having been converted to the second terminal device or the first terminal device.

A further aspect of the present invention is a data-relaying device used for a method of relaying data between a first terminal device connected to a first network and a second terminal device connected to a second network, the data-relaying device comprising: means for receiving location information of at least either one of the first terminal device or the second terminal device; means for storing the location information; means for receiving data upon data communication between the first terminal device and the second terminal device; means for searching in the storing means based on location information accompanying the data received from the first terminal device or the second terminal device; means for converting the location information accompanying the data if the location information exists in the storing means as a result of the searching, so that the location information stored in the storing means becomes a new location information of the data; and means for sending the data accompanied with the location information having been converted to the second terminal device or the first terminal device.

A further aspect of the present invention is a computer program for relaying data between a first terminal device connected to a first network and a second terminal device connected to a second network, comprising: machine-executable code for searching in a storing device based on location information accompanying data received from the first terminal device, the storing device storing location information indicative of a location of at least the first terminal device; machine-executable code for converting, if the location information exists in the storing device as a result of the searching, the location information accompanying the data so that the location information stored in the storing device becomes a new location information of the data; and machine-executable code for sending the data accompanied with the location information having been converted to the second terminal device.

In the above, the first network and the first terminal device may be compliant with Mobile IPv6 protocol, and the second network and the second terminal device may be compliant with IPv6 protocol but not with Mobile IPv6 protocol.

Embodiments

An embodiment of the present invention will be explained with reference to FIG. 1, and FIG. 8 through FIG. 10.

Figure 8:
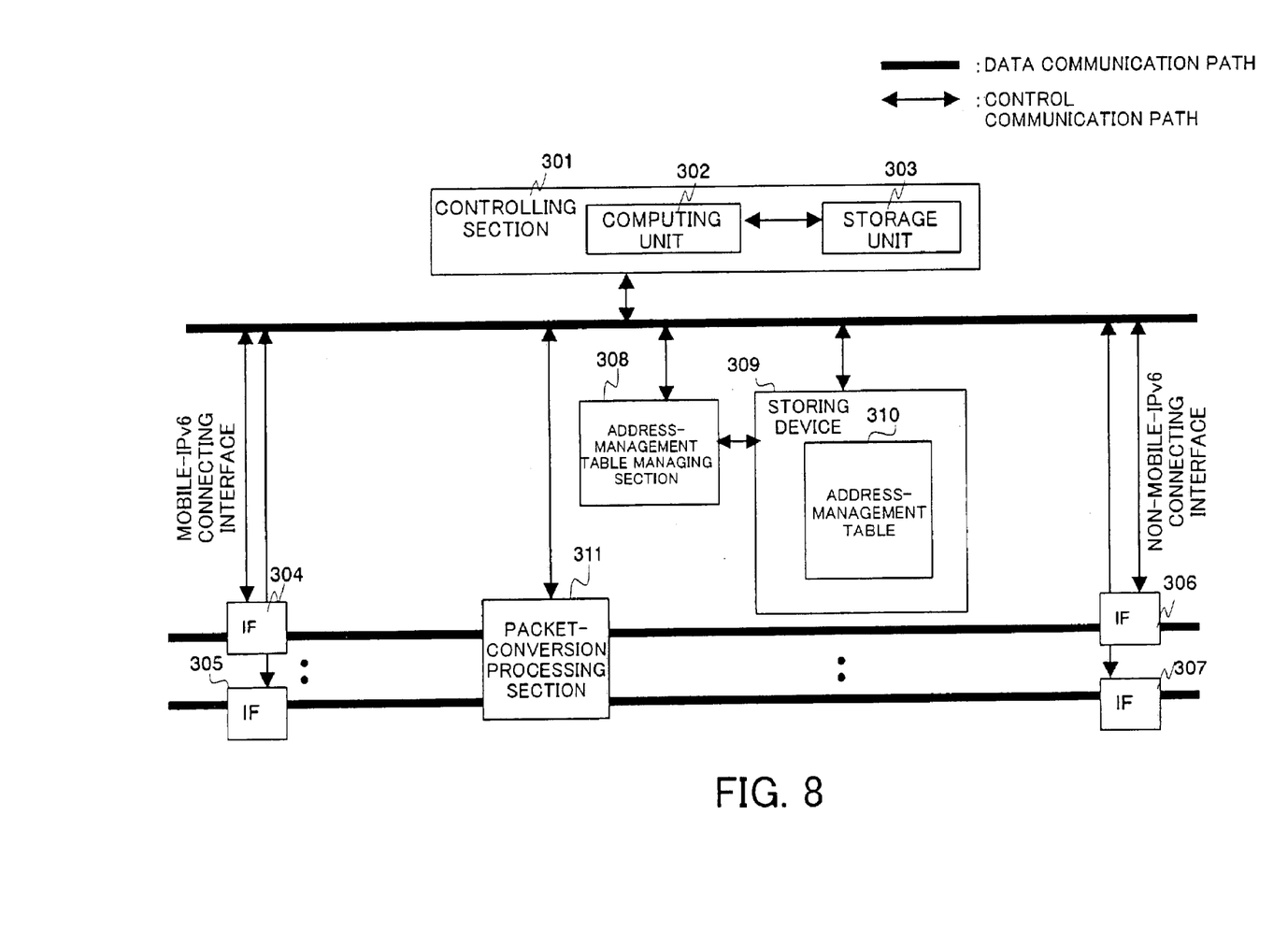
FIG. 8 is a block diagram showing an example of an inner configuration of a router, which is an example of a data-relaying device, according to one embodiment of the present invention.

Firstly, explanation will be made of a configuration of a data-relaying device according to one embodiment of the present invention. In this embodiment, the data-relaying device is a router 40 functioning as a gateway, as specifically exemplified in FIG. 1. As in FIG. 1, the connecting relationship between a home agent 20, a Mobile-IPv6-compliant terminal (an example of a "first terminal device") 10, an IPv6-fixed terminal (an example of a "second terminal device") 30, and the router (an example of a "data-relaying device") 40 is substantially the same as that explained in the Background of the Invention. An example of an inner configuration of the router 40, which is the data-relaying device in the present embodiment, will be explained with reference to the block diagram shown in FIG. 8. As in FIG. 8, the router 40 comprises, for example: a section 301 for controlling the overall operations of the router 40 (or, "controlling section 301"); a plurality of interfaces 304 and 305 for connecting to the Mobile-IPv6-compliant terminal 10 via a network; a plurality of interfaces 306 and 307 for connecting to the IPv6-fixed terminal (non-Mobile IPv6 terminal) 30; a storing device (or an address-management-table storing means) 309 for storing an address-management table 310; an address-management-table managing section 308 for managing the address-management table 310; and a section 311 for processing packet conversion (or, "packet-conversion processing section 311"). The controlling section 301 comprises a computing unit 302 and a storage unit 303 connected to each other via a control communication path. As shown in FIG. 8, the above-mentioned sections numbered from 301 through 311 are appropriately connected to each other via communication paths for control (or "control communication path") and communication paths for data (or "data communication path"). The structure of an example of the address-management table is as explained above with reference to FIG. 5.

Explanation will be made of processing communication between the Mobile-IPv6-compliant terminal 10 and the IPv6-fixed terminal 30 via the router 40 having the above-mentioned configuration. Note that the communication functions of the home agent 20, the Mobile-IPv6-compliant terminal 10, and the IPv6-fixed terminal 30 are as explained in the Background of the Invention. The home agent 20 informs (or announces) path information corresponding to the home address of the Mobile-IPv6-compliant terminal 10 to the network.

Figure 9:
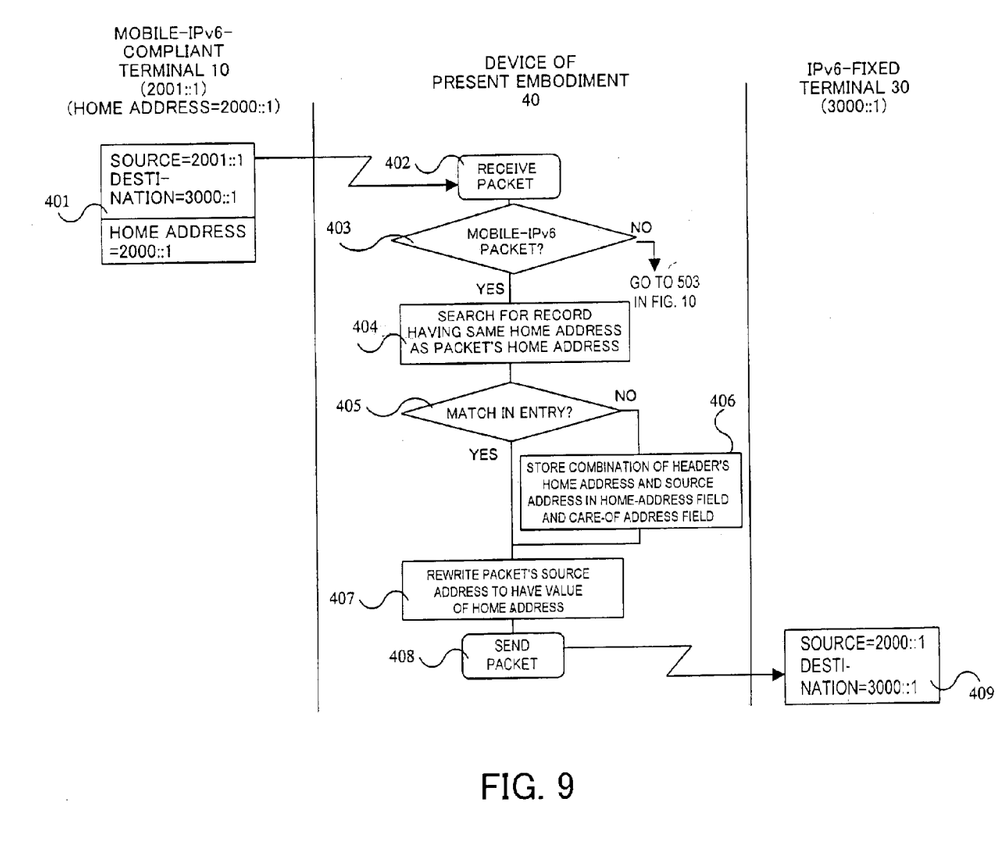
FIG. 9 is a flowchart showing procedures of sending a packet from a Mobile-IPv6-compliant terminal to an IPv6-fixed terminal according to one embodiment of the present invention.

Firstly, explanation will be made of sending a packet from the Mobile-IPv6-compliant terminal 10 to the IPv6-fixed terminal 30 with reference to the flowchart shown in FIG. 9. As shown in FIG. 9, the Mobile-IPv6-compliant terminal 10 has a value 2001::1 as its care-of address, and a value 2000::1 as its home address. On the other hand, the IPv6-fixed terminal 30 has a value 3000::1 as its address. Before moving, upon sending a packet, the Mobile-IPv6-compliant terminal 10 sets the source address to have a value of its own care-of address (i.e., 2001::1), and sets the destination address to have a value of the address of the IPv6-fixed terminal 30 to which the packet is sent (i.e., 3000::1) (401 in FIG. 9). Here, the IPv6-extension header of the packet includes a value of the home address of the Mobile-IPv6-compliant terminal 10 (i.e., 2000::1).

Figure 10:
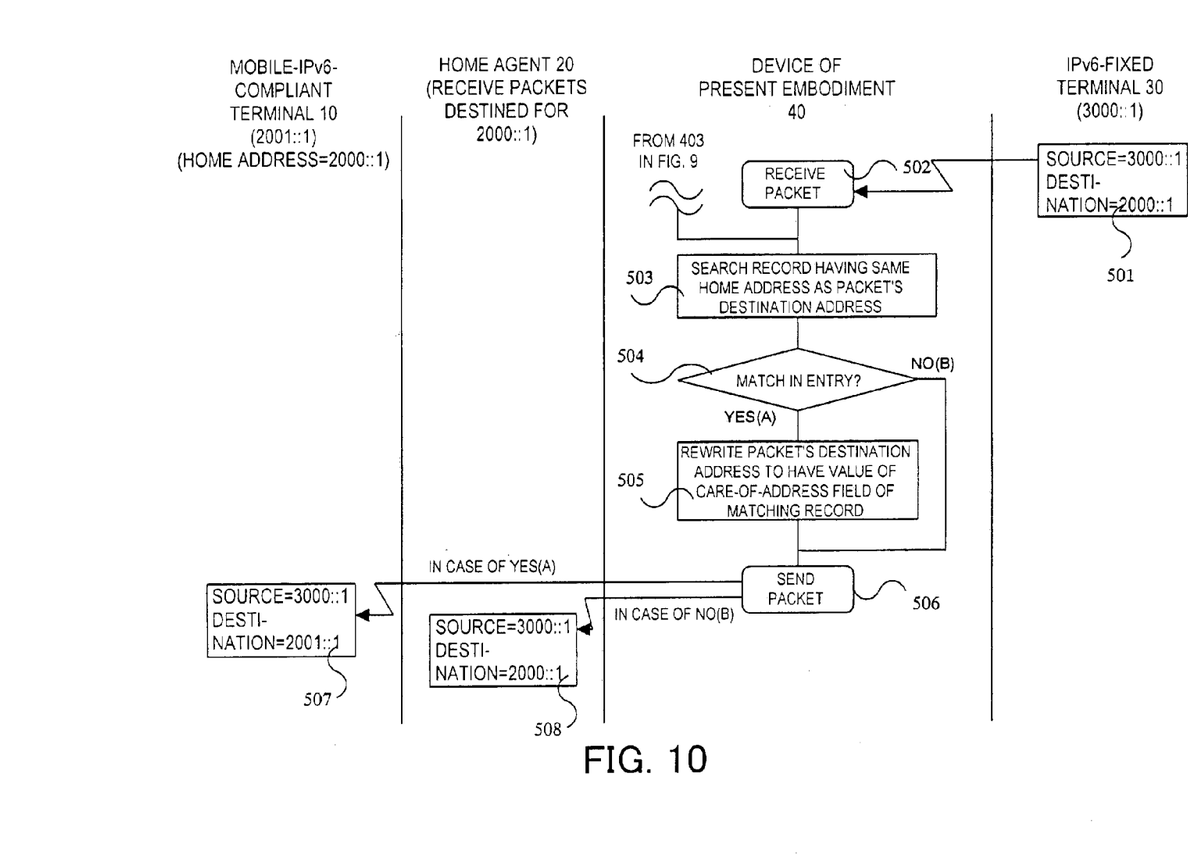
FIG. 10 is a flowchart showing procedures of sending a packet from an IPv6-fixed terminal to a Mobile-IPv6-compliant terminal according to one embodiment of the present invention.

When the router 40 receives the packet, the router 40 decides whether the packet is from the Mobile-IPv6-compliant terminal 10 (402→403). If the received packet is not a packet from the Mobile-IPv6-compliant terminal 10 (403: NO), process 503 of FIG. 10 is carried out.

On the contrary, if the received packet is a packet from the Mobile-IPv6-compliant terminal 10 (403: YES), the router 40 searches in the address-management table of FIG. 8 for a record having the same home address as the home address included in the extension header of the packet (404). This searching operation is carried out by referring to the address-management table 310 in the storing device 309 under the control of the controlling section 301.

If there is no matching record as a result of the search (405: NO in FIG. 9), the router 40 writes-in and stores the combination of the home address and the source address in the packet header to the respective fields in the address-management table 310 in the storing device 309. This storing operation is carried out by writing-in the addresses to the address-management table 310 in the storing device 309 via the address-management-table managing section 308 under the control of the controlling section 301.

On the contrary, if there is a matching record as a result of the search (405: YES at "match in entry?" in FIG. 9), the router 40 carries out an operation (location-information conversion) of rewriting (or converting) the source address in the packet to a value of the home address in the matching record. This rewriting operation is carried out by updating the address-management table 310 in the storing device 309 via the address-management-table managing section 308 under the control of the controlling section 301. The router 40 sends, to the IPv6-fixed terminal 30, the packet in which the source address has been rewritten to have the value of the home address (i.e., 2000::1) (408). The IPv6-fixed terminal 30 receives this sent packet (409).

In this case, the IPv6-fixed terminal 30 stores in its own storing section each of the addresses included in the header of the received packet. That is, the value of the source address held in the IPv6-fixed terminal 30 is kept to be 2000::1. During packet communication, even when the care-of address, which is to be the source address, changes as a result of the Mobile-IPv6-compliant terminal 10 moving to another network, the router 40 carries out the operation to rewrite (convert) the source address of a packet to have a value of the home address. Thus, the source address of the packet received at the IPv6-fixed terminal 30 will not change even if the Mobile-IPv6-compliant terminal 10 moves and the care-of address changes. Accordingly, since the source address will not change before and after the movement of the terminal 10, the IPv6-fixed terminal 30 will recognize the packet communication to be a packet from the same source, and will be able to maintain a continuous packet communication without interruption. Thus, packet loss will not occur.

Now, explanation will be made of sending a packet from the IPv6-fixed terminal 30 to the Mobile-IPv6-compliant terminal 10 with reference to the flowchart shown in FIG. 10. As shown in FIG. 10, the Mobile-IPv6-compliant terminal 10 has a value 2001::1 as its care-of address, and has a value 2000::1 as its home address. The IPv6-fixed terminal 30 has a value 3000::1 as its address.

Upon sending a packet, the IPv6-fixed terminal 30 sets the source address to have a value having its own address (i.e., 3000::1), and sets the destination address to have a value having the home address of the Mobile-IPv6-compliant terminal 10 to which the packet is sent (i.e., 2000::1) (501 in FIG. 10). Having received this packet, the router 40 searches in the address-management table for a record having the same home address as the destination address of the packet (503). This searching operation is carried out by referring to the address-management table 310 in the storing device 309 under the control of the controlling section 301.

If there is a matching record as a result of the search (504: YES at "match in entry?" in FIG. 10), the router 40 carries out an operation of rewriting (or converting) the destination address in the packet header to a value of the care-of address in the matching record. This rewriting operation is carried out by updating the address-management table 310 in the storing device 309 via the address-management-table managing section 308 under the control of the controlling section 301. The router 40 sends, to the Mobile-IPv6-compliant terminal 10, the packet in which the destination address has been rewritten to have the value of the care-of address (i.e., 2001::1) (506). The Mobile-IPv6-compliant terminal 10 receives this sent packet (507).

Here, the source address of the packet being sent is kept the same, while the destination address is the care-of address. Therefore, when if the Mobile-IPv6-compliant terminal 10 moves, if the care-of address of the terminal 10 is updated to the address-management table in the router 40, packet communication can be maintained.

On the contrary, if there is no matching record as a result of the search (504: NO in FIG. 10), the router 40 will not rewrite the destination address nor the source address in the header, but will send the packet as it is (508). The home agent 20 will receive the packet, and, after carrying out the processes shown in FIG. 6, will send the packet to the Mobile-IPv6-compliant terminal 10.

That is, regardless of whether the Mobile-IPv6-compliant terminal 10 has moved or not, when the IPv6-fixed terminal 30 starts communication with the Mobile-IPv6-compliant terminal 10, the terminal 30 will send a packet designating the home address as the destination address. When the Mobile-IPv6-compliant terminal 10 makes a response, even if the care-of address changes after movement of the terminal 10, communication can be maintained because it is possible to rewrite the source address of the packet header to have the corresponding home address by referring to the address-management table of the router 40.

According to the above-mentioned embodiment, for example, it is possible to significantly reduce relaying in packet communication between a Mobile-IPv6-compliant terminal and a IPv6-fixed terminal, regardless of whether the Mobile-IPv6-compliant terminal has moved or not.

Although the preferred embodiment of the present invention has been described in detail, it should be understood that various changes, substitutions and alterations can be made therein without departing from spirit and scope of the inventions as defined by the appended claims.

What is claimed is:

1. A method of relaying data between a first terminal device connected to a first network and a second terminal device connected to a second network, said method comprising:

searching in a storing device based on location information accompanying data received from said first terminal device, said storing device storing location information indicative of a location of at least said first terminal device, said location information including a home address and a care-of address;

as a result of said searching, if said location information exists in said storing device, converting said location information accompanying said data so that said location information stored in said storing device becomes a new location information of said data; and sending said data accompanied with said location information having been converted to said second terminal device, wherein, upon relaying said data from said first terminal device to said second terminal device, a source address of said data is converted from said care-of address to said home address corresponding to said care-of address.

2. A method of relaying data according to claim 1, wherein said storing device stores said location information that changes according to movement of said first terminal device.

3. A method of relaying data according to claim 2, wherein, when said care-of address of said first terminal device changes, said storing device stores said care-of address having changed in a manner said care-of address having changed corresponds to said home address.

4. A method of relaying data according to claim 3, wherein, upon relaying said data from said second terminal device to said first terminal device, a destination address of said data is converted from said home address to said care-of address corresponding to said home address.

5. A method of relaying data according to claim 1, wherein said first network and said first terminal device are compliant with Mobile IPv6 protocol; and said second network and said second terminal device are compliant with IPv6 protocol but not compliant with Mobile IPv6 protocol.

6. A data-relaying device used for a method of relaying data between a first terminal device connected to a first network and a second terminal device connected to a second network, said data-relaying device comprising:

means for receiving location information of said first terminal device; means for storing said location information, said location information including a home address and a care-of address, means for receiving data upon data communication between said first terminal device and said second terminal device;

means for searching in said storing means based on location information accompanying said data received from said first terminal device;

means for converting said location information accompanying said data if said location information exists in said storing means as a result of said searching, so that said location information stored in said storing means becomes a new location information of said data; and means for sending said data accompanied with said location information having been converted to said second terminal device.

wherein, upon relaying said data from said first terminal device to said second terminal device, said converting means converts a source address of said data is from said care-of address to said home address corresponding to said care-of address.

7. A data-relaying device according to claim 6, wherein said storing means stores said location information that changes according to movement of said first terminal device.

8. A data-relaying device according to claim 7, wherein, when said care-of address of said first terminal device changes, said storing means stores said care-of address having changed in a manner said care-of address having changed corresponds to said home address.

9. A data-relaying device according to claim 8, wherein, upon relaying said data from said second terminal device to said first terminal device, said converting means converts a destination address of said data from said home address to said care-of address corresponding to said home address.

10. A data-relaying device according to claim 6, wherein said first network and said first terminal device are compliant with Mobile IPv6 protocol; and said second network and said second terminal device are compliant with IPv6 protocol but not compliant with Mobile IPv6 protocol.

11. A method of relaying data between a first terminal device connected to a first network and a second terminal device connected to a second network, said method comprising:

searching in a storing device based on location information accompanying data received from said first terminal device, said storing device storing location information indicative of a location of at least said first terminal device including a home address and a care-of address;

as a result of said searching, if said location information exists in said storing device, converting said location information accompanying said data so that said location information stored in said storing device becomes a new location information of said data; and sending said data accompanied with said location information having been converted to said second terminal device, wherein, upon relaying said data from said first terminal device to said second terminal device, a source address of said data is converted from said care-of address to said home address corresponding to said care-of address.

12. A method of relaying data according to claim 11, wherein said first network and said first terminal device are compliant with Mobile IPv6 protocol; and said second network and said second terminal device are compliant with IPv6 protocol but not compliant with Mobile IPv6 protocol.

13. A data-relaying device used for a method of relaying data between a first terminal device connected to a first network and a second terminal device connected to a second network, said data-relaying device comprising:

means for receiving location information of said first terminal device, said location information including a home address and a care-of address;

means for storing said location information;

means for receiving data upon data communication between said first terminal device and said second terminal device;

means for searching in said storing means based on location information accompanying said data received from said first terminal device or said second terminal device;

means for converting said location information accompanying said data if said location information exists in said storing means as a result of said searching, so that said location information stored in said storing means becomes a new location information of said data; and means for sending said data accompanied with said location information having been converted to said second terminal device, wherein, upon relaying said data from said first terminal device to said second terminal device, said converting means converts a source address of said data from said care-of address to said home address corresponding to said care-of address.

14. A data-relaying device according to claim 13, wherein said first network and said first terminal device are compliant with Mobile IPv6 protocol; and said second network and said second terminal device are compliant with IPv6 protocol but not compliant with Mobile IPv6 protocol.

15. A computer readable medium encoded with a computer program for relaying data between a first terminal device connected to a first network and a second terminal device connected to a second network, comprising:

machine-executable code for searching in a storing device based on location information accompanying data received from said first terminal device, said storing device storing location information indicative of a location of at least said first terminal device including a home address and care-of address;

machine-executable code for converting, if said location information exists in said storing device as a result of said searching, said location information accompanying said data so that said location information stored in said storing device becomes a new location information of said data; and machine-executable code for sending said data accompanied with said location information having been converted to said second terminal device;

wherein, upon relaying said data from said first terminal device to said second terminal device, said converting machine-executable code for converts a source address of said data from said care-of address to said home address corresponding to said care-of address.

16. A computer readable medium encoded with a computer program according to claim 15, wherein said first network and said first terminal device are compliant with Mobile IPv6 protocol; and said second network and said second terminal device are compliant with IPv6 protocol but not compliant with Mobile IPv6 protocol.

* * * * *